(12) United States Patent
Itonaga

(10) Patent No.: US 7,050,378 B2
(45) Date of Patent: May 23, 2006

(54) OPTICAL PICKUP

(75) Inventor: Makoto Itonaga, Kanagawa-ken (JP)

(73) Assignee: Victor Company of Japan, Limited, Kanagawa-ken (JP)

(*) Notice: Subject to any disclaimer, the term of this patent is extended or adjusted under 35 U.S.C. 154(b) by 509 days.

(21) Appl. No.: 10/386,417

(22) Filed: Mar. 13, 2003

(65) Prior Publication Data

US 2003/0174632 A1 Sep. 18, 2003

(30) Foreign Application Priority Data

Mar. 18, 2002 (JP) .......................... P2002-074686

(51) Int. Cl.
*G11B 7/00* (2006.01)
*G11B 7/135* (2006.01)

(52) U.S. Cl. .............................. 369/112.08; 369/112.24

(58) Field of Classification Search ...................... None
See application file for complete search history.

(56) References Cited

U.S. PATENT DOCUMENTS

| | | | |
|---|---|---|---|
| 5,969,862 A | 10/1999 | Maruyama | |
| 6,101,035 A | 8/2000 | Maruyama | |
| 6,876,501 B1* | 4/2005 | Kimura et al. | 359/719 |
| 6,898,168 B1* | 5/2005 | Kimura et al. | 369/112.01 |
| 2002/0097504 A1 | 7/2002 | Kitamura et al. | |

FOREIGN PATENT DOCUMENTS

EP 1 154 417 11/2001
EP 1 276 104 1/2003

* cited by examiner

*Primary Examiner*—William Korzuch
*Assistant Examiner*—Tawfik Goma
(74) *Attorney, Agent, or Firm*—Nath & Associates PLLC; Gregory B. Kang; Stanley N. Protigal (57) ABSTRACT

Disclosed is such an optical pickup controlling an aberration even if optical axes of an objective lens and another optical system are shifted from each other. The optical pickup is a device for recording or reproducing an information signal by irradiating light along a track of a rotating optical disk, including a light source, a beam expander for changing a parallelism of light emitted from the light source, and an objective lens 33 for collecting the light emitted from the beam expander along the track of the optical disk and for irradiating the collected light thereonto, wherein the beam expander is comprised of a concave lens 31 and a Fresnel lens 32, and a focal distance $f_n$ of the diffraction lens exists in a range satisfying the following inequality:

$$f_1 < f_n < f_2,$$

where $$f_1 = ((\lambda_2/\lambda_1) - 1) f_0 v_0$$

$$f_2 = (1 - (\lambda_2/\lambda_1)) b$$

$$b = -f_0(f_0 + \Delta)/\Delta$$

$\lambda_1$ and $\lambda_2$ are a designed lower limit wavelength and a designed upper limit wavelength, respectively, $f_0$ and $v_0$ are a focal distance and a partial dispersion of the objective lens, respectively, and $\Delta$ is a difference between focal distances corresponding to the wavelengths $\lambda_1$ and $\lambda_2$.

8 Claims, 5 Drawing Sheets

OPTICAL PICKUP

BACKGROUND OF THE INVENTION

1. Field of the Invention

The present invention relates to an optical pickup that emits a beam to an optical disk and records and regenerates information signals to and from the optical disk.

2. Description of the Related Art

Optical disks, or optical recording media are used to store information signals or data including motion picture data, voice data, and computer data. The optical disks are mass-producible at low cost, and therefore, are widely used. Increasing requests for the optical disks are to improve the recording density and capacity thereof.

To improve the recording density of an optical disk, there are two approaches. One is to shorten the wavelength of light used to read data from the optical disk. The other is to increase the numerical aperture (NA) of an objective lens used to focus light on the optical disk.

When CDs (compact disks) were developed into DVDs (digital versatile disks or digital video disks), the wavelength was shortened from 780 nm to 650 nm and the objective-lens NA was improved from 0.45 to 0.60, thereby achieving a density improvement of about seven times from 650 MB to 4.7 GB (one side).

Recordable optical disks employ nearly the same wavelength and NA as those mentioned above, irrespective of their types such as a magneto-optical type and a phase change type.

A typical optical pickup presently used to read/write an optical disk employs a single objective lens formed from glass or resin. The objective lens has aspherical end surfaces to correct aberration. Lenses of this type are mass-producible by molding at low cost, and therefore, are widely used.

To further improve the recording density and capacity of an optical disk, a pickup employing a blue laser as well as an objective lens having a high NA must be developed.

An optical pickup employing a light source of 450 nm or shorter in wavelength and an objective lens of 0.7 or greater in NA must simultaneously correct axial chromatic aberration and spherical chromatic aberration. The axial chromatic aberration is a focal point variation due to a wavelength variation, and the spherical chromatic aberration is spherical aberration due to a wavelength variation. In this specification, the spherical chromatic aberration is called wavelength-error-based spherical aberration.

The reason why the objective lens having an NA of 0.7 or greater and employing a light source of 450 nm or shorter in wavelength necessitates the correction of axial chromatic aberration and wavelength-error-based spherical aberration will be explained.

First, the light of 450 nm in wavelength causes large dispersion by optical material such as glass of the objective lens, to produce large axial aberration and large spherical aberration.

Second, the increased NA of the objective lens increases refraction angles along the periphery of the lens. Even a small wavelength variation causes a large refraction angle change, to cause large spherical aberration.

The axial chromatic aberration and wavelength-error-based spherical aberration are each chromatic aberration. They, however, are caused by different reasons and have different characteristics.

The axial chromatic aberration is caused in an optical pickup by wavelength spread due to superimposed high frequencies applied to a laser diode, by a sudden wavelength variation due to a sudden power change at the laser diode during the recording of an optical disk, or by a wavelength error due to an individuality of the laser diode.

The axial chromatic aberration due to power change suddenly occurs in synchronization with a power change. This sudden change is difficult to follow by a focus servo mechanism that drives an objective lens of the optical pickup in a focusing direction. A range of wavelengths that must be coped with is about ±1 to ±2 nm. In the case of a laser diode employing superimposed high frequencies, it simultaneously emits beams of different wavelengths to a lens, and therefore, always causes focus errors in connection with wavelengths other than a reference wavelength.

If the optical pickup receives wavelengths spreading in a certain range or encounters a sudden wavelength variation, it will cause a focusing error due to axial chromatic aberration. This focusing error (defocusing) is severe, and therefore, must be corrected.

The wavelength-error-based spherical aberration is caused by wavelength variations due to the individuality of a laser diode and by changes in the temperature of the laser diode.

The wavelength-error-based spherical aberration is stable or changes relatively slowly, and a range of wavelengths that must be coped with is about ±5 to ±10 nm.

It has been known heretofore that a diffraction lens having chromatic aberration characteristics of which polarity is reverse to that of the refraction lens is useful for the correction of the chromatic aberration. It can be said that, most simply, if a lens system setting lens power thereof at zero is placed before the objective lens, then the correction of the chromatic aberration can be executed. In this case, this lens system is formed by combining a diffraction lens made into a convex lens and a refraction type concave lens of which absolute value of a focal distance is equal to that of the diffraction lens.

Here, the diffraction lens is a lens having a blaze structure formed on a flat plate, which is designed to collect axial beams without any aberration in a designed wavelength at a designed reference focal distance, and has high diffraction efficiency in the designed wavelength.

However, in the case where a single objective lens is applied to a light source having a high numerical aperture and a short wavelength, for example, such as the numerical aperture of 0.7 or greater and the wavelength of 450 nm of shorter, the spherical aberration due to the wavelength error generated in the case where the wavelength is shifted from the designed reference wavelength is increased, thus causing a problem that a sufficient correction cannot be performed by means of a simple diffraction lens.

Meanwhile, Japanese patent Laid-Open Publication No. 6-82725 suggests a designing method for a diffraction lens, in which the chromatic aberration generated in the objective lens is completely corrected. The contents of the above are described in detail in "Kaisetsu kogaku Soshi Nyumon", Optronics, Co., Ltd., p. 94 by the inventors of this publication.

However, according to this method, though the spherical aberration due to the wavelength error can be corrected, there is a problem that a large aberration appears by a lens shift caused by the tracking operation of the objective lens when a correction lens is placed on the fixed portion of the optical system. Specifically, the optical axes of the objective lens driven by the tracking operation and another optical system of the fixed portion are shifted from each other, and thus an aberration containing a comatic aberration as a main component is caused, which will then adversely affect the recording/reproduction of the optical disk significantly.

Although this problem can be avoided if the correction lens is moved integrally with the objective lens, a movable portion of an actuator for driving these objective and correction lenses is increased in weight, and the frequency characteristics of the actuator are lowered, causing a problem that a necessary band cannot be secured.

SUMMARY OF THE INVENTION

It is an object of the present invention to provide such an optical pickup controlling the aberration even if the optical axes of the objective lens and another optical system are shifted from each other.

In order to solve the above-described problems, an optical pickup of the present invention is one that records or reproduces an information signal by irradiating light along a track of a rotating optical disk, including a light source, a beam expander for changing a parallelism of light emitted from the light source, and an objective lens for collecting the light emitted from the beam expander along the track of the optical disk and for irradiating the collected light thereonto, wherein the beam expander is comprised of a concave lens and a diffraction lens, and a focal distance fn of the diffraction lens exists in a range satisfying the following inequality:

$$f_1 < f_n < f_2$$

where $$f_1 = ((\lambda_2/\lambda_1) - 1)f_0 v_0$$

$$f_2 = (1 - (\lambda_2/\lambda_1))b$$

Note that the following equations should be established:

$$v_0 = (n_0 - 1)/(n_1 - n_2)$$

$$b = -f_0(f_0 + \Delta)/\Delta$$

where a designed reference wavelength, a designed lower limit wavelength and a designed upper limit wavelength are $\lambda_0$, $\lambda_1$ and $\lambda_2$, respectively (here, $\lambda_0 - \lambda_1 = \lambda_2 - \lambda_0$), refractive indices of the objective lens, which correspond to these wavelengths, are $n_0$, $n_1$ and $n_2$, respectively, and a difference between focal distances corresponding to the wavelengths $\lambda_1$ and $\lambda_2$ is $\Delta$.

Desirably, the objective lens is controlled to move in a radial direction of the optical disk such that the collected light is irradiated along the track of the optical disk, and the beam expander is fixed to the optical pickup. Hence, the optical axes of the objective lens and another optical system including the beam expander may sometimes be shifted from each other in accordance with the movement of the objective lens.

Desirably, a wavelength of the light source is of 450 nm or shorter in wavelength, and the objective lens is a single lens having a numerical aperture (NA) of 0.7 or greater.

Desirably, the diffraction lens has any of a diffraction surface and diffraction surfaces formed on any of one surface and both surfaces of a flat plate. Desirably, the diffraction lens having the diffraction surfaces formed on both surfaces of the flat plate satisfy sinusoidal conditions.

Here, the diffraction lens having a diffraction surface formed on one surface of the flat plate is referred to as a Fresnel lens. In the Fresnel lens, there are one corrected by primary diffraction light and one corrected by high-order diffraction light. The latter Fresnel lens is sometimes referred to as a high-order Fresnel lens.

The diffraction lens constituting the beam expander is a diffraction lens formed on any of one surface and both surfaces of a flat plate, which uses diffraction light of a specific order. This diffraction lens is designed to have no aberration and high diffraction efficiency for the diffraction light of the specific order. Simultaneously, the diffraction lens is designed to have the focal distance thereof to substantially correct a focal error component generated by the chromatic aberration of the objective lens, that is, an axial error.

Meanwhile, a spherical aberration occurs by an error between the wavelength of the light source and the designed reference wavelength of the objective lens, a manufacturing error of the objective lens, or a thickness error of the transmission layer of the optical disk. This spherical aberration is corrected by changing the parallelism of light by the beam expander. Note that the concave lens of the beam expander is also in slightly charge of correcting the axial chromatic aberration.

Here, the diffraction lens increases convergence of light transmitted therethrough when the wavelength of the light source is longer than the reference wavelength. Thus, the wavelength of the transmitted light is elongated, and thus the diffraction lens operates to cancel the elongated length of the focal distance of the objective lens and to form the focal point on a focal surface approximately identical to that of the reference wavelength.

When there is a wavelength error, the wavefront of the light transmitted through the diffraction lens becomes a shape approximate to a sphere formed when the converged light is converged into a paraxial focal point. This is for suppressing the increase of the aberration when the objective lens is shifted.

The lens shift when the spherical wave is made incident onto the diffraction lens is equivalent to that when light is made obliquely incident onto the objective lens, and the lens shift corresponds to image height characteristics themselves. Here, because the radius of the spherical wave for correcting the chromatic aberration is extremely large, the image height due to the lens shift is extremely low, and the increase of the aberration is small.

As described above, the light incident onto the objective lens fails to be parallel if the wavelengths thereof are not the reference wavelength. Therefore, a spherical aberration due to a magnification error is generated. This spherical aberration due to the magnification error has a polarity identical to that of the spherical aberration of the single objective lens due to the wavelength error. Therefore, the aberration in the wavelengths other than the reference wavelength are somewhat increased in comparison with the case where the light with the wavelengths other than the reference wavelength are collected by the single objective lens.

Here, the above-described spherical aberration is canceled in such a manner that the beam expander is adjusted to change the parallelism of the light incident onto the objective lens and thus the spherical aberration due to the magnification error is generated in the objective lens. Hence, for the reason identical to the above-described one, the generation of the aberration due to the lens shift is suppressed to be small.

As described above, the correction of the spherical aberration is completed in the objective lens, and the other portions are not involved therein. Hence, in the present invention, the aberration is controlled even if the optical axes of the objective lens and another optical system are shifted from each other.

In the present invention, the beam expander is set as follows. First, the convergence of light is set so that the aberration can be minimized at a center wavelength. Here, the center wavelength is, for example, a mean value of varied wavelengths of the light source if such variations occur. Moreover, the convergence is set so as to minimize the spherical aberration of the optical system combining both of the color correction element and the objective lens.

Next, with regard to a wavelength slightly shifted from the center wavelength, the convergence of light is changed by the beam expander to control the focus error to the minimum, thus suppressing the generation of the aberration.

Here, when the wavelength is changed from the reference wavelength, the change of the curvature radius of the wavefront is in reverse directions between the correction of the axial chromatic aberration and the correction of the spherical aberration. For example, for a longer wavelength, converging light is required for correcting the axial chromatic aberration, and diverging light is required for correcting the spherical aberration.

In this shifted wavelength, the wavelength is shifted, and the convergence is changed in the direction reverse to the direction where the spherical aberration is corrected as described above. Therefore, the spherical aberration is increased. However, this spherical aberration is further smaller than the aberration of the defocus, which is generated in the case where the axial chromatic aberration is not corrected, and thus brings no problem on practical use.

BRIEF DESCRIPTION OF THE DRAWINGS

FIGS. 2A to 2C are diagrams illustrating Fresnel lenses.

DETAILED DESCRIPTION OF THE PREFERRED EMBODIMENT

An embodiment of an optical pickup according to the present invention will be described below in detail with reference to the drawings.

Figure 1:
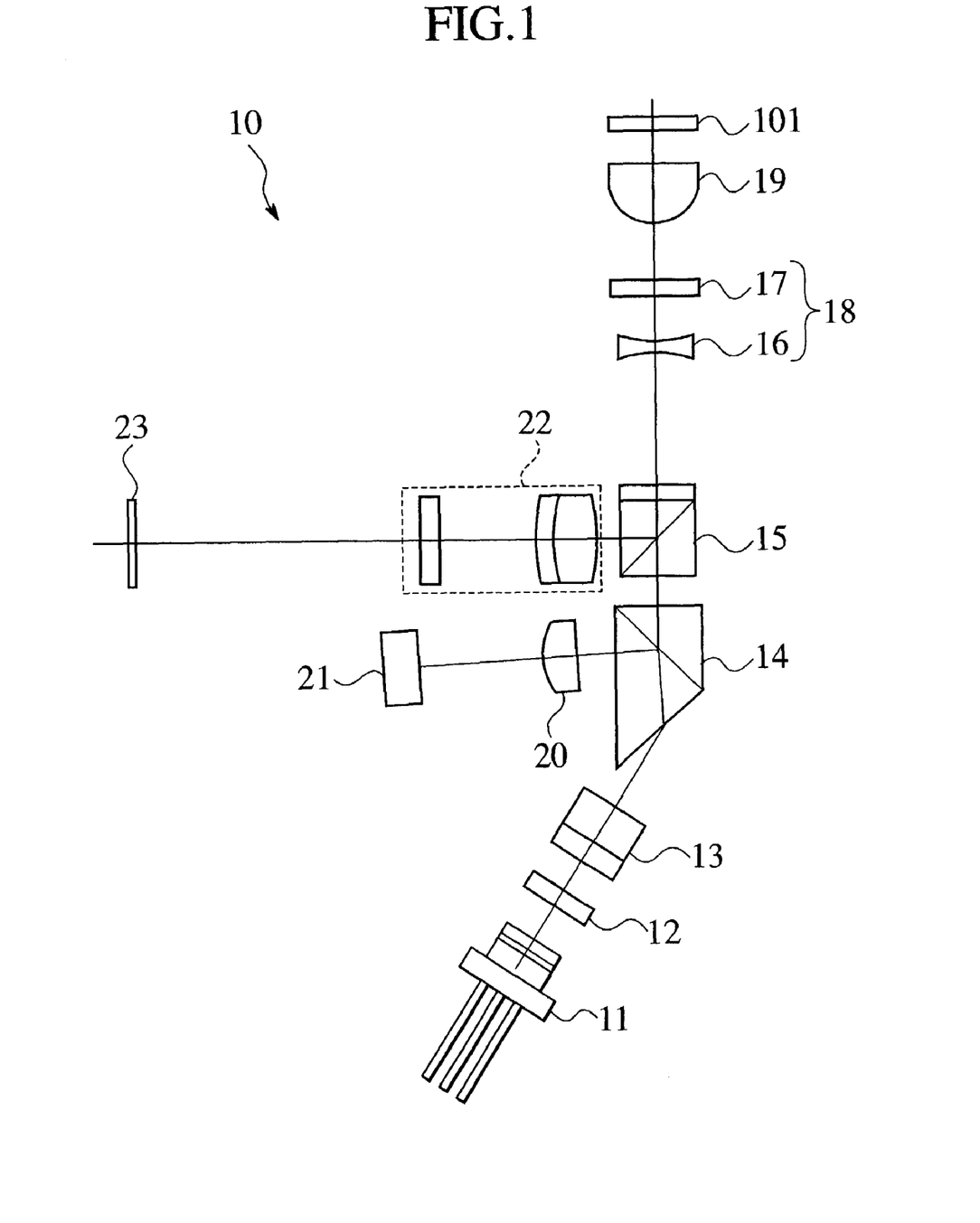
FIG. 1 is a diagram illustrating a schematic constitution of an optical pickup.

FIG. 1 is a diagram illustrating a schematic constitution of the optical pickup.

The optical pickup 10 is a device for recording or reproducing an information signal by irradiating light along the track of the rotating optical disk 101. The optical pickup 10 includes the laser diode 11 serving as a light source, the beam expander 18 for changing a parallelism of light emitted from the laser diode 11, and the objective lens 19 for collecting the light emitted from the beam expander 18 along the track of the optical disk 101 and irradiating the collected light thereonto the optical disk 101, in which the beam expander 18 is comprised of the concave lens 16 and the Fresnel lens 17 having a diffraction surface formed on one surface of a flat plate, and the focal distance $f_n$ of the diffraction lens 17 exists in a range satisfying the following inequality:

$$f_1 < f_n < f_2$$

where $$f_1 = ((\lambda_2/\lambda_1) - 1) f_0 v_0$$

$$f_2 = (1 - (\lambda_2/\lambda_1)) b$$

Note that the following equations should be established:

$$v_0 = (n_0 - 1)/(n_1 - n_2)$$

$$b = -f_0(f_0 + \Delta)/\Delta$$

where the designed reference wavelength, designed lower limit wavelength and designed upper limit wavelength of the optical pickup 10 are $\lambda_0$, $\lambda_1$ and $\lambda_2$, respectively (here, $\lambda_0 - \lambda_1 = \lambda_2 - \lambda_0$), the refractive indices of the objective lens 19, which correspond to these wavelengths, are $n_0$, $n_1$ and $n_2$, respectively, and a difference between focal distances corresponding to the wavelengths $\lambda_1$ and $\lambda_2$ is $\Delta$.

Here, $f_0$ is the focal distance of the objective lens 19, and $v_0$ is the partial dispersion of the optical material of the objective lens 19. Moreover, the designed reference wavelength is a reference wavelength when designing the optical pickup 10. The optical pickup 10 is designed so as to obtain desired performance in a certain wavelength range around the designed reference wavelength as a center. The lower and upper limits of this range are the designed lower and upper limit wavelengths. Note that the designed lower and upper limit wavelengths are located in positions symmetric with respect to the designed reference wavelength.

Specifically, the optical pickup 10 includes the laser diode 11 serving as a light source with a reference wavelength of 405 nm, the grating 12, the collimator lens 13, the beam-forming and achromatic prism 14, the deflection beam splitter 15, the concave lens 16, the Fresnel lens 17 and the objective lens 19 with a numerical aperture of 0.7 or greater.

Moreover, the optical pickup 10 includes the condenser lens 20, the front monitor photodiode 21, the detection lens tube 22, and the photodiode 23.

The objective lens 19 is a single lens of an aspheric lens with a numerical aperture (NA) of 0.7 or greater, and is provided on a movable portion of an unillustrated actuator. The objective lens 19 undergoes a tracking control in the radial direction of the optical disk 101 by the actuator so as to irradiate the collected light along the track of the optical disk 101. The movement of the objective lens 19 by the tracking control is referred to as a lens shift.

The beam expander 18 is comprised of the concave lens 16 and the Fresnel lens 17, and can change the parallelism of light by adjusting an interval between these two lenses. The beam expander 18 is fixed to the optical pickup 10. Hence, the optical axes of the objective lens 19 and another optical system will be shifted from each other by the lens shift.

The Fresnel lens 17 has a function as a convex lens for the concave lens 16 in the beam expander 18, and a focal distance thereof is designed to correct a focal error component generated by the chromatic aberration of the objective lens.

It is satisfactory if the Fresnel lens 17 is designed to have no aberration and high diffraction efficiency for diffraction light with an order for use in the design. In this embodiment, the Fresnel lens has a diffraction surface on one surface of the flat plate.

In this embodiment, the designed reference wavelength $\lambda_0$, the designed lower limit wavelength $\lambda_1$ and the designed upper limit wavelength $\lambda_2$ are set at 405 nm, 400 nm and 410 nm, respectively. The focal distance of the objective lens 19 is 2.2 m, and the refractive indices $n_0$, $n_1$ and $n_2$ of the objective lens 19, which correspond to the wavelength $\lambda_0$, $\lambda_1$ and $\lambda_2$, are 1.76898, 1.77027 and 1.76776, respectively.

In this case, b is equal to 0.0045 mm, and $f_1$ becomes equal to 16.9 mm, and $f_2$ becomes equal to 26.9 mm. Hence, it is necessary to set the focal distance $f_n$ of the Fresnel lens 17 in a range satisfying the following inequality:

$$16.9 \text{ mm} < f_n < 26.9 \text{ mm}$$

For instance, in this embodiment, the focal distance $f_n$ is set equal to 22 mm in this range.

Figure 2A:
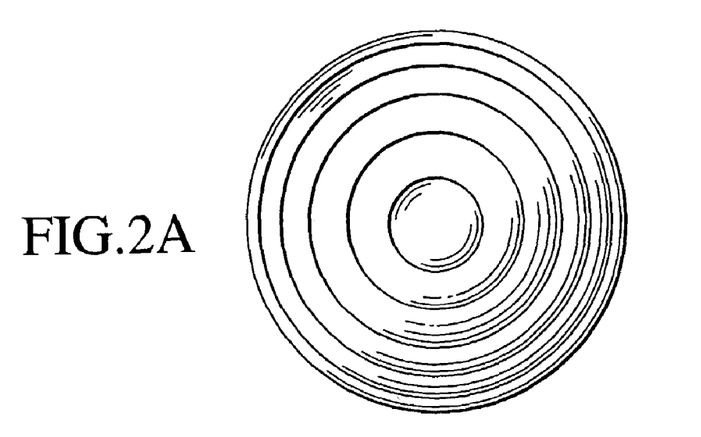
Figure 2C:
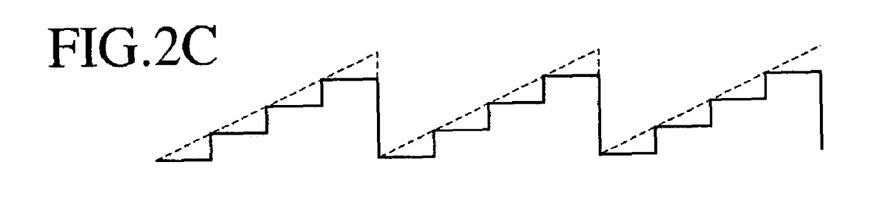

FIGS. 2A to 2C are diagrams illustrating the Fresnel lens 17 and another. FIG. 2A is a plan view of the Fresnel lens 17, and FIG. 2B is a cross-sectional diagram of the Fresnel lens 17. FIG. 2C is an enlarged cross-sectional diagram of another Fresnel lens.

In the Fresnel lens 17 illustrated in the cross-sectional diagram of FIG. 2B, a blaze having an analog shape is formed on one surface of the flat plate. Such a shape is advantageous in terms of the diffraction efficiency. Note that, from a viewpoint of the aberration performance, similar characteristics to those of the blaze having the analog shape can be obtained even by another Fresnel lens having the blaze in the staircase shape illustrated in FIG. 2C, that is, a so-called multi-step blaze.

Here, though it is conceived that a lens using the primary diffraction light is usually referred to as the Fresnel lens, a lens using high-order diffraction light equal to or higher than the secondary diffraction light may also be used. In this case, because a pitch of rings can be expanded, manufacturing thereof is facilitated. Note that, even if the high-order diffraction light is used, the focal distance of the Fresnel lens for the high-order light is equal to that in the case of using the primary diffraction light, and the chromatic aberration can be corrected therefor.

As described above, the focal distance of the Fresnel lens 17 is set so as to substantially correct the focal error component generated due to the chromatic aberration of the objective lens 19. Moreover, if an optical material having high dispersion characteristics is used for the optical material of the concave lens 16 of the beam expander 18, this concave lens 16 also generates the function of correcting the chromatic aberration to some extent. Hence, a better result is obtained if the focal distance of the Fresnel lens 17 is set in consideration of the above-described point. However, actually, the correction effect of the concave lens 16 for the chromatic aberration is little, and the Fresnel lens 17 mainly takes charge of correcting the chromatic aberration.

Moreover, in the case where the diameter of light is fixed in the Fresnel lens 17, then the focal distance is shortened, the pitch of the rings is narrowed. In consideration that it becomes difficult to manufacture the lens when the pitch is narrowed, the correction effect for the chromatic aberration can also be set somewhat lower, and the focal distance of the Fresnel lens 17 can also be set somewhat longer than a focal distance with which the chromatic aberration can be corrected optimally.

Figure 3:
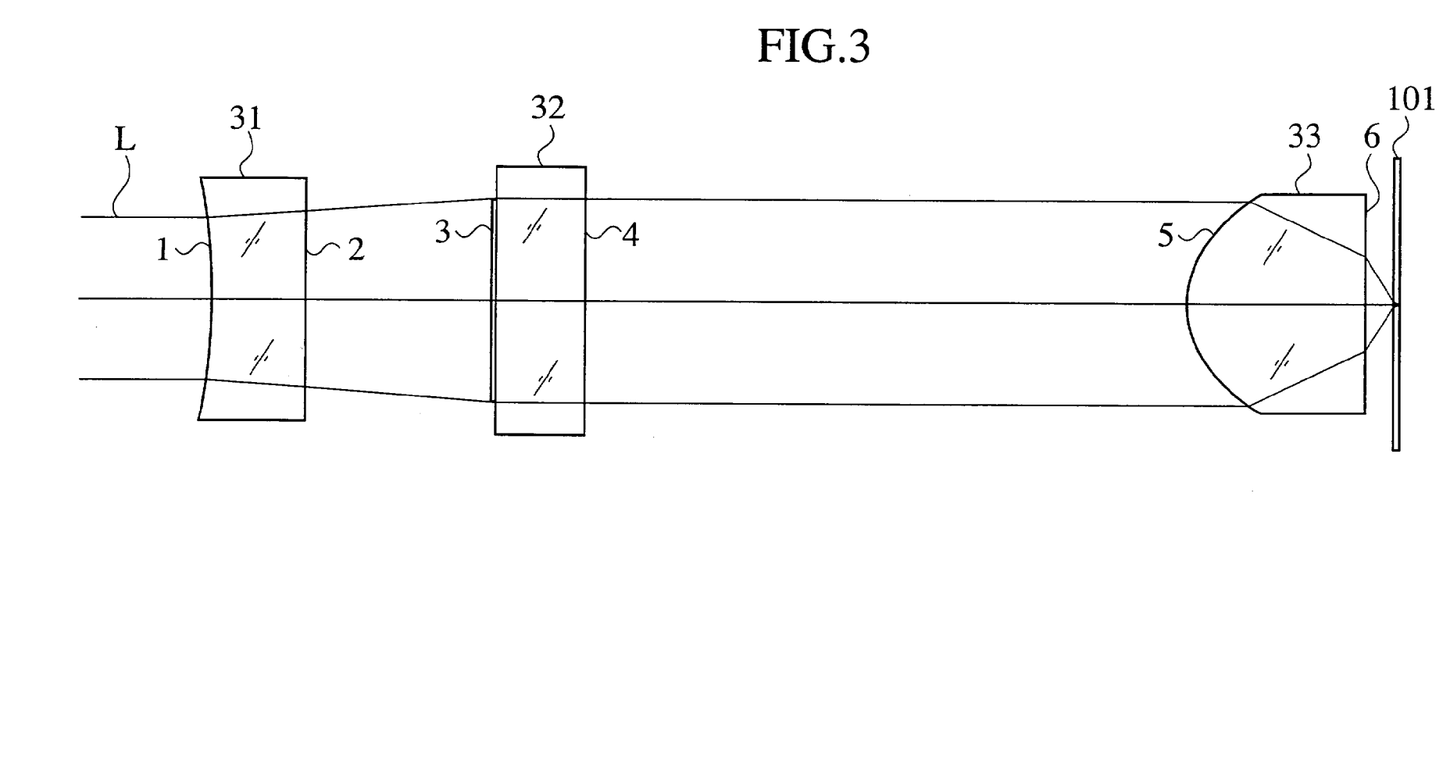
FIG. 3 is an optical path diagram of an optical system of the optical pickup.

FIG. 3 is an optical path diagram of the optical system of the optical pickup 10.

The concave lens 31, the Fresnel lens 32 and the objective lens 33 in the drawing correspond to the concave lens 16, the Fresnel lens 17 and the objective lens 19, respectively in FIG. 1. Hereinafter, these concave lens 31, Fresnel lens 32 and objective lens 33 will be referred to as the optical system. The concave lens 31 and the Fresnel lens 32 constitute the beam expander (corresponding to the reference numeral 18 in FIG. 1). The designed reference wavelength of this optical system is 405 nm.

The concave lens 31 has the first and second surfaces 1 and 2. The Fresnel lens 32 has the third and fourth surfaces 3 and 4. The objective lens 33 has the fifth and sixth surfaces 5 and 6. On the third surface of the Fresnel lens 32, a diffraction surface is formed.

The light L made incident onto the optical system is made incident onto the optical disk 101 through the concave lens 31, the Fresnel lens 32 and the convex lens 33.

Table 1 shows the specifications of the objective lens 33.

TABLE 1

| | |
|---|---|
| Designed wavelength | 405 nm |
| NA | 0.85 |
| Focal distance | 2.20 mm |
| Diameter of incident pupil | 3.74 mm |
| Magnification | 0 |

Table 2 shows the specifications of the Fresnel lens 32.

TABLE 2

| | |
|---|---|
| Designed wavelength | 405 nm |
| Focal distance | 22 mm |

Table 3 shows the design values of the entire optical system including the beam expander.

The fifth and sixth face 5 and 6, which are aspherical, are represented by the following polynomial:

$$Z = CH^2/(1+(1-(1+K)C^2H^2)^{0.5}) + AH^4 + BH^6 + DH^8 + EH^{10} + FH^{12}$$

where Z is a distance from the vertex of the surface, C (=1/R) is a curvature at the vertex of the surface, H is a height from an optical axis, K is a conic constant, and A, B, D, E and F are aspherical coefficients of degrees 4 to 12. For example, A is a coefficient for $H^4$.

TABLE 3

| Surface number | Surface shape | Diameter | Thickness | Glass | Conic constant |
|---|---|---|---|---|---|
| 1 | Aspheric surface | −11.55408 | 2 | SF8 | −0.525285 |
| 2 | Spherical surface | −126.0047 | | | |
| 3 | Diffraction surface | Infinite | 1.5 | Quartz glass | |
| 4 | Flat surface | Infinite | 10.0 | | |
| 5 | Aspheric surface | 1.81217 | 3.104 | NBF1 | −0.337179 |
| 6 | Aspheric surface | −6.50758 | 0.501 | | −845.651557 |
| 7 | Flat surface | Infinite | 0.1 | poly-carbonate | |
| Image surface | | | | | |

TABLE 4

| | |
|---|---|
| Coefficient of fourth power of H | −0.00092006967 |
| Coefficient of sixth power of H | −0.00025706693 |
| Coefficient of eighth power of H | −0.00057872391 |
| Coefficient of tenth power of H | 0.0002222827 |
| Coefficient of twelfth power of H | −5.6787923 × $10^{-6}$ |

Table 5 shows the aspheric coefficients of the sixth surface 6.

TABLE 5

| Coefficient of fourth power of H | 0.061448774 |
| --- | --- |
| Coefficient of sixth power of H | −0.13995629 |
| Coefficient of eighth power of H | 0.12867014 |
| Coefficient of tenth power of H | −0.043733069 |

Table 6 shows the refractive indices and Abbe numbers of the optical materials.

TABLE 6

| | Refractive index | Abbe number |
| --- | --- | --- |
| SF8 | 1.72912789 | 31.18 |
| Quartz glass | 1.46968102 | 67.82 |
| NBFI | 1.76898499 | 49.22 |
| Polycarbonate | 1.62230752 | 29.91 |

The designed reference wavelength of the optical system of this embodiment is 405 nm. The concave lens 31 and the Fresnel lens 32 constitute the beam expander. Between them, the concave lens 31 is an aspheric lens with one aspheric surface on one surface thereof and has a focal distance of −17.6 mm in the reference wavelength. Note that, though the concave lens 31 may be an aspheric lens with aspheric surfaces on both surfaces thereof, good characteristics are obtained sufficiently by means of the aspheric lens with one aspheric surface of this embodiment.

The Fresnel lens 32 constituted of the third and fourth surfaces 3 and 4, in which the diffraction surface is formed on the third surface 3, is designed to have a focal distance of 22 mm in the reference wavelength and to eliminate the aberration on the axis.

Note that the focal distance of 22 mm may be designed for either the primary diffraction light or the secondary diffraction light. Incidentally, in the case of designing the focal distance for the primary diffraction light, the focal distance of the secondary diffraction light becomes 11 mm, where the aberration is then generated.

The magnification of the beam by the beam expander combining the Fresnel lens 32 with the concave lens 31 is 1.25. In the case of this optical system, it is the first object of the Fresnel lens 32 to convert, into parallel light, the light made into the diverging light by the concave lens 31.

Note that, when cover glass is interposed between the concave lens 31 and the Fresnel lens 32, or when the system is made such that the cover glass exists substantially in the optical path by making the fourth surface 4 of the Fresnel lens 32 into a diffraction surface, a constitution can be adopted, in which the design of the diffraction surface is changed, in order to correct a spherical aberration generated by the cover glass.

Figure 4:
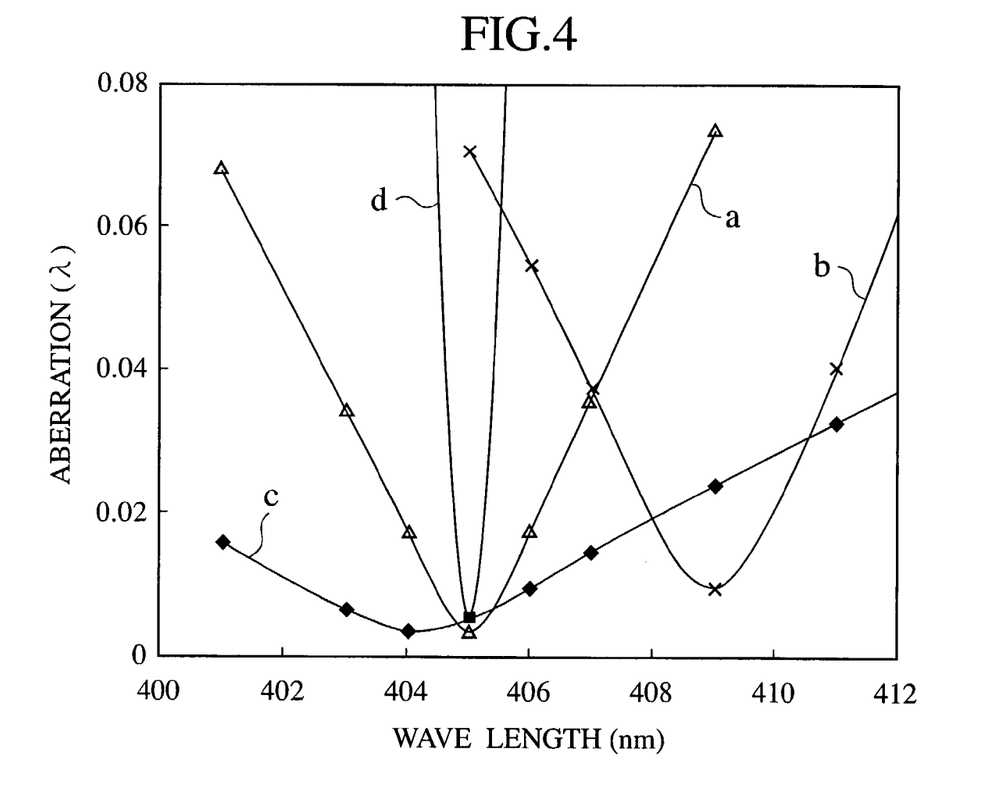
FIG. 4 is a graph showing wavelength-dependencies of aberrations of the optical system.

FIG. 4 is a graph showing the wavelength-dependencies of the aberrations of this optical system.

The curve "a" with white triangles shows RMS wavefront aberrations in the respective wavelengths with the image at the wavelength of 405 nm that is the reference wavelength taken as the best image on the surface in the optical system comprised of the concave lens 31, the Fresnel lens 32 and the objective lens 33. The light incident onto the optical system is parallel. From this graph, it is understood that the aberrations are suppressed to be sufficiently low in the wavelength range of approximately ±2 nm.

Moreover, with regard to the lens shift, because the light emitted from the beam expander comprised of the concave lens 31 and the Fresnel lens 32 is substantially parallel, the state of the incident light onto the objective lens is not changed due to the lens shift. Therefore, the aberrations are not increased.

Next, cases are conceived, where the peripheral temperature of the optical pickup 10 is greatly changed to cause the wavelength of the light source laser to be changed exceeding the above-described range, and where the wavelength is greatly changed from 405 nm as the reference wavelength due to the individual difference of the laser diode 11 of the light source. In this case, the aberrations are increased. For example, in the case of the wavelength of 409 nm, the aberration undesirably becomes $0.074\lambda$.

Accordingly, an interval between the concave lens 31 and the Fresnel lens 32 is adjusted to change the parallelism of the light. For instance, an interval of 3.12 mm, which is an initial value of the distance between the second surface 2 of the concave lens 31 and the third surface 3 of the Fresnel lens 32, is changed to 2.76 mm, and the light is converted slightly into a diverging light and is made incident onto the Fresnel lens 32. In such a manner, a good result is obtained.

The curve "b" with crosses shows the state of the RMS wavefront aberrations in the above-described case. It is understood that the aberration is $0.01\lambda$ in the wavelength of 409 nm and the aberrations are suppressed to be sufficiently low in the wavelength range of approximately ±2 nm with the above-described wavelength as a center.

In this state, even if the objective lens 33 is shifted from the optical axis of another optical system (the concave lens 31 and the Fresnel lens 32) by 0.3 mm, the aberration increase is extremely small, and performance without any problem is obtained.

Here, the characteristics of the single objective lens 33 without the beam expander are shown below, The curve "c" with black rhombuses shows the RMS wavefront aberrations in the case of using the objective lens 33 for the best image surfaces at the respective wavelengths. On the other hand, the curve "d" with a black square shows the RMS wavefront aberrations of the respective wavelengths with the image at the wavelength of 405 nm taken as the best image on the surface. It is shown that the curve d has further large aberrations than the curve c. When comparing, with this curve d, the curve b showing the aberration amounts at the respective wavelengths in this embodiment, the aberrations thereof are suppressed to be small.

In the above-described embodiment, the Fresnel lens 32 has the diffraction surface formed on one surface of the flat plate. Next, description will be made for a modification example using a diffraction lens having diffraction surfaces formed on both surfaces of the flat plate.

In the modification example, the basic constitution of the optical system is similar to that of the above-described embodiment except that the diffraction lens having the diffraction surfaces formed on the both surfaces of the flat plate is used.

Figure 5:
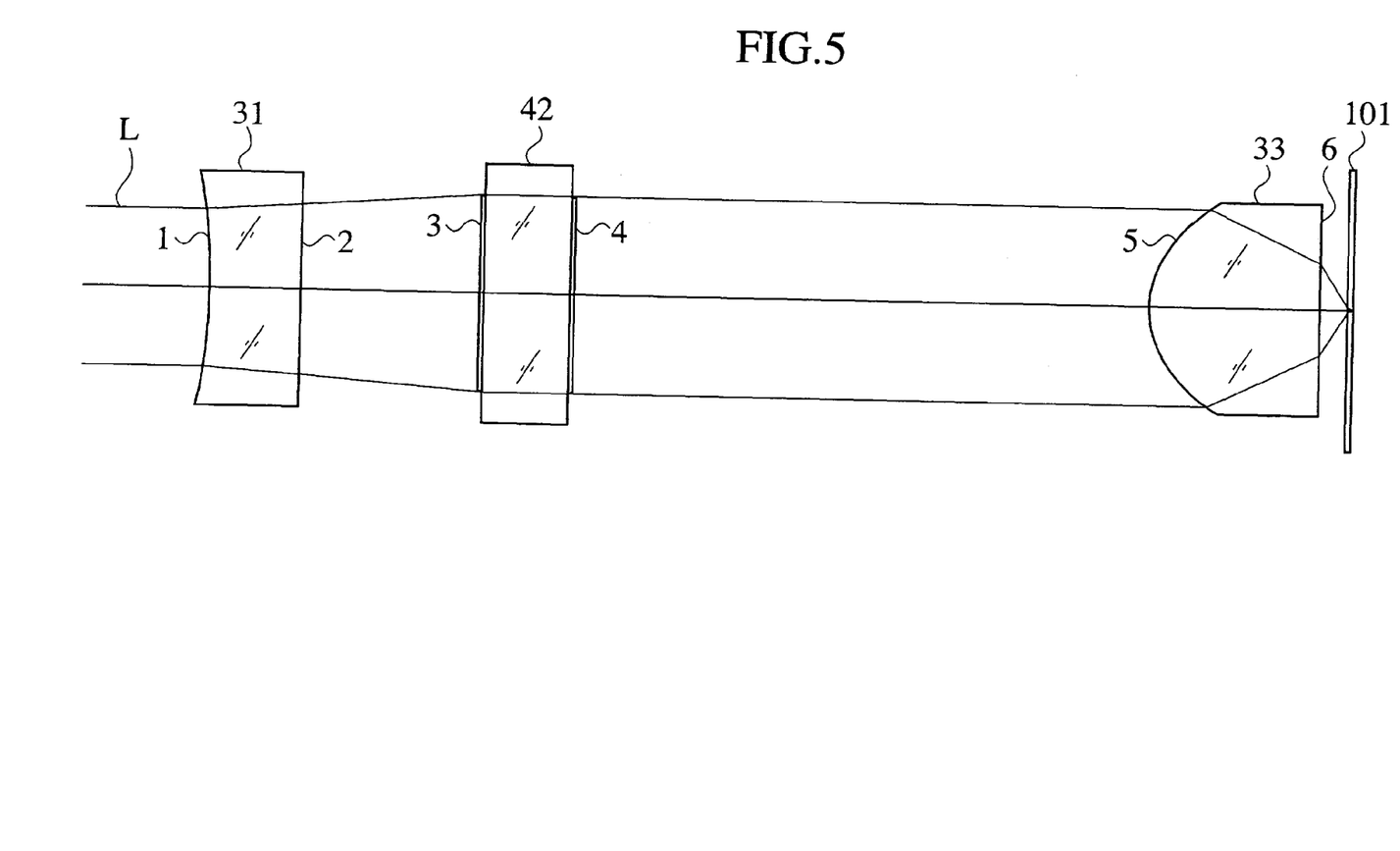
FIG. 5 is an optical path diagram of an optical system of a modification example.

FIG. 5 is an optical path diagram of the optical system of the modification example.

Note that, because the modification example is similar to the above-described embodiment except for the diffraction lens having the diffraction surfaces formed on the both surfaces of the flat plate, the same reference numerals will be added to corresponding members. The designed reference wavelength of the optical system in this modification example is also 405 nn.

The concave lens 31 has the first and second surfaces 1 and 2. The diffraction lens 42 has the third and fourth surfaces 3 and 4. The objective lens 33 has the fifth and sixth surfaces 5 and 6. The diffraction surfaces are formed on the third and fourth surfaces 3 and 4.

The light L made incident onto the optical system is made incident onto the optical disk 101 through the concave lens 31, the diffraction lens 42 and the convex lens 33.

In the modification example, the designed reference wavelength $\lambda_0$, the designed lower limit wavelength $\lambda_1$ and the designed upper limit wavelength $\lambda_2$ are set at 405 nm, 400 nm and 410 nm, respectively. The focal distance of the objective lens 33 is 2.2 m, and the refractive indices of the objective lens, which correspond to the wavelengths $\lambda_0$, $\lambda_1$ and $\lambda_2$, are 1.76898, 1.77027 and 1.76776, respectively.

In this case, b is equal to 0.0045 mm, and $f_1$ becomes equal to 16.9 mm, and $f_2$ becomes equal to 26.9 mm. Hence, it is necessary to set the focal distance $f_n$ of the diffraction lens 42 in a range satisfying the following inequality:

$$16.9 \text{ mm} < f_n < 26.9 \text{ mm}$$

For instance, in the modification example, the focal distance $f_n$ is set equal to 22 mm in this range.

Table 7 shows the design values of the entire optical system.

TABLE 7

| Surface number | Surface shape | Diameter | Thickness | Glass | Conic constant |
|---|---|---|---|---|---|
| 1 | Aspheric surface | −11.55408 | 2 | SF8 | −0.525285 |
| 2 | Spherical surface | −126.0047 | 2.43 | | |
| 3 | Diffraction surface | Infinite | 2 | Quartz glass | |
| 4 | Diffraction surface | Infinite | 10.0 | | |
| 5 | Aspheric surface | 1.81217 | 3.104 | NBF1 | −0.337179 |
| 6 | Aspheric surface | −6.50758 | 0.501 | | −845.651557 |
| 7 | Flat surface | Infinite | 0.1 | poly-carbonate | |
| Image surface | | | | | |

Table 8 shows the aspheric coefficients of the fifth surface.

TABLE 8

| | |
|---|---|
| Coefficient of fourth power of r | −0.00092006967 |
| Coefficient of sixth power of r | −0.00025706693 |
| Coefficient of eighth power of r | −0.00057872391 |
| Coefficient of tenth power of r | 0.0002222827 |
| Coefficient of twelfth power of r | −5.6787923 × 10$^{-6}$ |

Table 9 shows the aspheric coefficients of the sixth surface.

TABLE 9

| | |
|---|---|
| Coefficient of fourth power of r | 0.061448774 |
| Coefficient of sixth power of r | −0.13995629 |
| Coefficient of eighth power of r | 0.12867014 |
| Coefficient of tenth power of r | −0.043733069 |

The diffraction lens 42 constituted of the third surface 3 and the fourth surface 4 has a focal distance of 22 mm at the reference wavelength. In this case, the diffraction lens 42 is designed to have a focal distance of 22 mm and to eliminate the aberration on the axis for the primary diffraction light.

Furthermore, the diffraction lens 42 is designed to be capable of satisfying the sinusoidal conditions. The capability of satisfying the sinusoidal conditions is an advantageous point of the diffraction lens 42 having the diffraction surfaces formed on the both surfaces of the flat plate. The diffraction lens 42 has a feature to be capable of suppressing the aberration increase to be low when the diffraction lens 42 is made eccentric from the optical axis.

The phase function of the diffraction surface of the diffraction lens 42 is defined by the following equation:

$$\Phi = A_{2i} \times r^{2i}$$

where $\Phi$ is a phase change amount of the wavefront of the diffraction surface, of which unit is radian. A is a coefficient representing a phase. For example, if i is equal to 2, A will be a coefficient of the fourth power. r is a radius, of which unit is mm.

Table 10 shows the coefficients representing the phases of the third surface 3 as the diffraction surface.

TABLE 10

| | |
|---|---|
| Coefficient of second power of r | −179.23501 |
| Coefficient of fourth power of r | −3.0515157 |
| Coefficient of sixth power of r | 0.0041734327 |
| Coefficient of eighth power of r | −2.2873515 × 10$^{-5}$ |

Table 11 shows the coefficients representing the phases of the fourth surfaces 4 as the diffraction surface.

TABLE 11

| | |
|---|---|
| Coefficient of second power of r | −178.98511 |
| Coefficient of fourth power of r | 2.8626536 |
| Coefficient of sixth power of r | 0.0022603716 |
| Coefficient of eighth power of r | 1.6701881 × 10$^{-5}$ |

The magnification of light is 1.25 in the beam expander comprised of concave lens 31 and the diffraction lens 42.

Incidentally, the RMS wavefront aberration on the image surface at the wavelength of 405 nm in the optical system of the modification example is 0.004λ. On the same image surface, the RMS wavefront aberrations are 0.017λ at the wavelength of 404 nm and 0.016λ at the wavelength of 406 nm. As such, sufficiently good correction characteristics for the chromatic aberration are shown. With regard to the lens shift, because the light emitted from the chromatic aberration correction element is substantially parallel, the state of the incident light onto the objective lens 33 is not changed due to the lens shift. Therefore, the aberrations are not increased.

Next, cases are conceived, where the peripheral temperature of the optical pickup is greatly changed to cause the wavelength of the light source laser to be changed exceeding the above-described range, and where the wavelength is greatly changed from 405 nm due to the individual difference of the laser diode of the light source. In this case, the aberrations are increased. For example, in the case of the wavelength of 409 nm, the aberration undesirably becomes 0.058λ.

Accordingly, an interval between the concave lens 31 and the diffraction lens 32 is adjusted to change the parallelism of the light. For instance, an interval of 2.43 mm, which is an initial value of the distance between the second surface 2 of the concave lens 31 and the third surface 3 of the diffraction lens 42, is changed to 2.08 mm, and the light is converted slightly into a diverging light and is made incident onto diffraction lens 42. In such a manner, the aberration is suppressed to be as low as $0.009\lambda$. Furthermore, even if the objective lens 33 is shifted from the optical axis by 0.3 mm in this state, the aberration is $0.01\lambda$, in which the increase is extremely small. Thus, the problem-free performance is obtained.

As this diffraction lens 42, a lens may be used, which is designed to have no aberration and high diffraction efficiency for the diffraction light of an order for use in the design. Moreover, even if the orders of the diffraction light on the diffraction surfaces of the both surfaces of the flat plate are different from each other, operations thereof are not changed.

With regard to the focal distance, the diffraction lens 42 of this modification example has an equal focal distance to that of the Fresnel lens 32 of the above-described embodiment, which has the diffraction surface on one surface. Similarly to the above-described embodiment, the diffraction lens 42 can correct the chromatic aberration.

As described above, the focal distance of the diffraction lens 42 is set so as to substantially correct the focal error component generated due to the chromatic aberration of the objective lens 19. Furthermore, if an optical material having high divergent characteristics is used for the optical material of the concave lens 31 constituting the beam expander 18, this concave lens 31 also generates the function of correcting the chromatic aberration to some extent. Hence, a better result is obtained if the focal distance of the diffraction lens 42 is set in consideration of the above-described point. However, actually, the correction effect of the concave lens 31 for the chromatic aberration is little, and the diffraction lens 42 mainly takes charge of correcting the chromatic aberration.

Moreover, in the case where the diameter of light is fixed in the Fresnel lens 42, when the focal distance is shortened, the pitch of the rings is narrowed. In consideration that it becomes difficult to manufacture the lens when the pitch is narrowed, the correction effect for the chromatic aberration can also be set somewhat lower, and the focal distance of the diffraction lens 42 can also be set somewhat longer than a focal distance with which the chromatic aberration can be corrected optimally.

Although description has been made above focusing the chromatic aberration, the spherical aberration corrected by the optical system described here is not limited only to the spherical aberration caused by the wavelength error. It is needless to say that the residual spherical aberration of the objective lens 19 itself and the spherical aberration caused by the thickness error of the disk 101 can be corrected simultaneously.

Specifically, the optical pickup of this embodiment has good aberration correction characteristics, and simultaneously corrects the spherical aberration generated due to the error between the wavelength of the laser diode 11 of the light source and the designed reference wavelength of the objective lens 19, the manufacturing error of the objective lens 19, the thickness error of the transmission layer of the optical disk 101 or the like.

As described above, according to the present invention, it is possible to provide such an optical pickup controlling the aberration even if the optical axes of the objective lens and another optical system are shifted from each other.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An optical pickup for recording and reproducing an information signal by irradiating light along a track of a rotating optical disk, comprising:
   a light source;
   a beam expander for changing a parallelism of light emitted from the light source; and
   an objective lens for collecting the light emitted from the beam expander along the track of the optical disk and for irradiating the collected light thereonto,
   wherein the beam expander is comprised of a concave lens and a diffraction lens, and
   a focal distance $f_n$ of the diffraction lens exists in a range satisfying a following inequality:

$$f_1 < f_n < f_2,$$

wherein $f_1$ and $f_n$ are given by the following expressions:

$$f_1 = ((\lambda_2/\lambda_1) - 1)f_0 v_0$$

$$f_2 = (1 - (\lambda_2/\lambda_1))b$$

wherein partial dispersion $v_0$ and length b are given by:

$$v_0 = (n_0 - 1)/(n_1 - n_2)$$

$$b = -f_0(f_0 + \Delta)/\Delta$$

$\lambda_0$, $\lambda_1$ and $\lambda_2$ are a designed reference wavelength, a designed lower limit wavelength and a designed upper limit wavelength, respectively (here, $\lambda_0 - \lambda_1 = \lambda_2 - \lambda_0$),
   $n_0$, $n_1$ and $n_2$ are refractive indices of the objective lens, the indices corresponding to these wavelengths, respectively,
   $f_0$ is a focal distance of the objective lens, and $\Delta$ is a difference between focal distances corresponding to the wavelengths $\lambda_1$ and $\lambda_2$.

2. The optical pickup according to claim 1, wherein the objective lens is controlled to move in a radial direction of the optical disk such that the collected light is irradiated along the track of the optical disk, and the beam expander is fixed to the optical pickup.

3. The optical pickup according to claim 2, wherein a wavelength of the light source is 450 nm or less, and the objective lens is a single lens having a numerical aperture (NA) of 0.7 or greater.

4. The optical pickup according to claim 3, wherein the diffraction lens has any of a diffraction surface and diffraction surfaces formed on any of one surface and both surfaces of a flat plate.

5. The optical pickup according to claim 2, wherein the diffraction lens has any of a diffraction surface and diffraction surfaces formed on any of one surface and both surfaces of a flat plate.

6. The optical pickup according to claim 1, wherein a wavelength of the light source is 450 nm or less, and the objective lens is a single lens having a numerical aperture (NA) of 0.7 or greater.

7. The optical pickup according to claim 6, wherein the diffraction lens has any of a diffraction surface and diffraction surfaces formed on any of one surface and both surfaces of a flat plate.

8. The optical pickup according to claim 1, wherein the diffraction lens has any of a diffraction surface and diffraction surfaces formed on any of one surface and both surfaces of a flat plate.

* * * * *

UNITED STATES PATENT AND TRADEMARK OFFICE
CERTIFICATE OF CORRECTION

| | | |
|---|---|---|
| PATENT NO. | : 7,050,378 B2 | Page 1 of 1 |
| APPLICATION NO. | : 10/386417 | |
| DATED | : May 23, 2006 | |
| INVENTOR(S) | : Itonaga | |

It is certified that error appears in the above-identified patent and that said Letters Patent is hereby corrected as shown below:

Claim 1, Column 14, Line 20, delete "$f_n$" and replace with -- $f_2$ --

Signed and Sealed this

Eighth Day of August, 2006

JON W. DUDAS
*Director of the United States Patent and Trademark Office*